INVENTORS:
DAVID M. WILLIS,
WILLIAM O. YOUNG, JR.
and WALTER J. QUATTLEBAUM

BY Parrott, Bell, Seltzer, Park & Heard

ATTORNEYS

Feb. 23, 1971 D. M. WILLIS ET AL 3,564,695
APPARATUS FOR PREPARING PACKAGES OF YARN
FOR SUBSEQUENT TREATMENT
Filed June 13, 1967 9 Sheets-Sheet 5

INVENTORS:
DAVID M. WILLIS,
WILLIAM O. YOUNG, JR.
and WALTER J. QUATTLEBAUM

BY Parrott, Bell, Seltzer, Park & Heard
ATTORNEYS

INVENTORS:
DAVID M. WILLIS,
WILLIAM O. YOUNG, JR.
BY and WALTER J. QUATTLEBAUM

ATTORNEYS

United States Patent Office 3,564,695
Patented Feb. 23, 1971

1

3,564,695
APPARATUS FOR PREPARING PACKAGES OF YARN FOR SUBSEQUENT TREATMENT
David M. Willis, William O. Young, Jr., and Walter J. Quattlebaum, Spartanburg, S.C., assignors to Butte Knitting Mills, Spartanburg, S.C., a corporation of Delaware
Filed June 13, 1967, Ser. No. 645,645
Int. Cl. B23p 19/04
U.S. Cl. 29—234                                    12 Claims

ABSTRACT OF THE DISCLOSURE

Apparatus whereby a plurality of core supported wound packages of yarn are moved in a predetermined common path of travel past a core replacement station and a replacement core is substituted for the winding core at the core replacement station, in order to prepare the packages of yarn for subsequent treatment such as dyeing and the like.

---

At a certain stage in some processes for the manufacture of textile goods, yarn which is to be formed subsequently into the goods by knitting, weaving or the like is wound into packages about supporting cores and thereafter heat treated with steam or by the circulation of a hot liquid through the packages to dye or otherwise treat the yarn. In many such fluid treatment processes involving wound packages of yarn, it is preferred that the supporting core for the package during the treatment process be a perforate core, in order that fluid may flow radially of the wound package and treat the yarn uniformly throughout the package. Due to the fluids and temperatures frequently used in such fluid treatment processes, cores used during treatment processes preferably are formed of a corrosion resistant material which has a long useful life, such as stainless steel. The various requirements that treatment cores have perforate walls and be formed of stainless steel have heretofore presented two particular difficulties which have had unfavorable effects on the operations of yarn processors.

More particularly, a yarn processor's choice heretofore generally has been between the necessity of supplying a large number of relatively expensive treatment cores and the alternative necessity of processing yarn through an additional and otherwise unnecessary winding operation. The number of treatment cores needed to permit winding the yarn onto such cores at the last necessary winding operation prior to dyeing must be such as to permit maintaining the entire inventory of yarn moving through these two processing stages on such cores. If that large number of cores is not to be provided, then an additional winding operation for the transfer of yarn from more conventional and less expensive package cores made of rigid paper tube to the treatment cores only as required for immediate processing must be added to the processor's operations. In either event, the investment of capital required for the textile operation is increased by either of the alternative requirements of providing machinery for an intermediate winding operation or providing a substantially greater number of the relatively expensive treatment cores than would otherwise be necessary. In certain limited instances, an effort has been made to provide equipment capable of replacing the winding cores of individual packages with treatment cores without rewinding the packages, but the additional handling of individual packages thus required has precluded any realization of an improvement.

With the foregoing particularly in mind, it is an object of the present invention to provide an apparatus and method which avoids the deficiencies heretofore present in textile operations wherein wound packages of yarn are prepared for subsequent treatment such as dyeing by the replacement of a winding core with a treatment core. In realizing this object of the present invention, a method is followed wherein a plurality of wound packages are presented in orderly succession at a core replacement station, and the winding core employed during the conventional winding operation is replaced at that station by a core particularly adapted for the next following processing step, such as dyeing. Through the employment of an apparatus as disclosed and claimed herein, a textile yarn processing operation may avoid both the necessity of providing an excessively large number of treatment cores and the necessity of introducing a winding process merely to transfer yarn from one core to another. Thus, substantial economies are realized through the present invention.

It is a more specific object of the present invention to provide an apparatus including means for transporting wound packages of yarn along a predetermined path of travel including a core replacement station and means operative in connection with the transportation of wound packages for replacing a winding core on which the package is supported with a perforate core suitable for a subsequent fluid treatment operation such as dyeing.

A still further object of this invention is to provide a method of preparing wound packages of yarn for a subsequent fluid treatment operation wherein a plurality of the wound packages are moved along a predetermined common path of travel including a core replacement station while the winding cores on which the packages are formed are replaced by perforate cores as each package is successively sensed to be of proper size for core replacement and presented at the core replacement station.

Some of the objects and advantages of the invention having been stated, others will appear as the description proceeds, when taken in connection with the accompanying drawings, in which.

Figure 1:
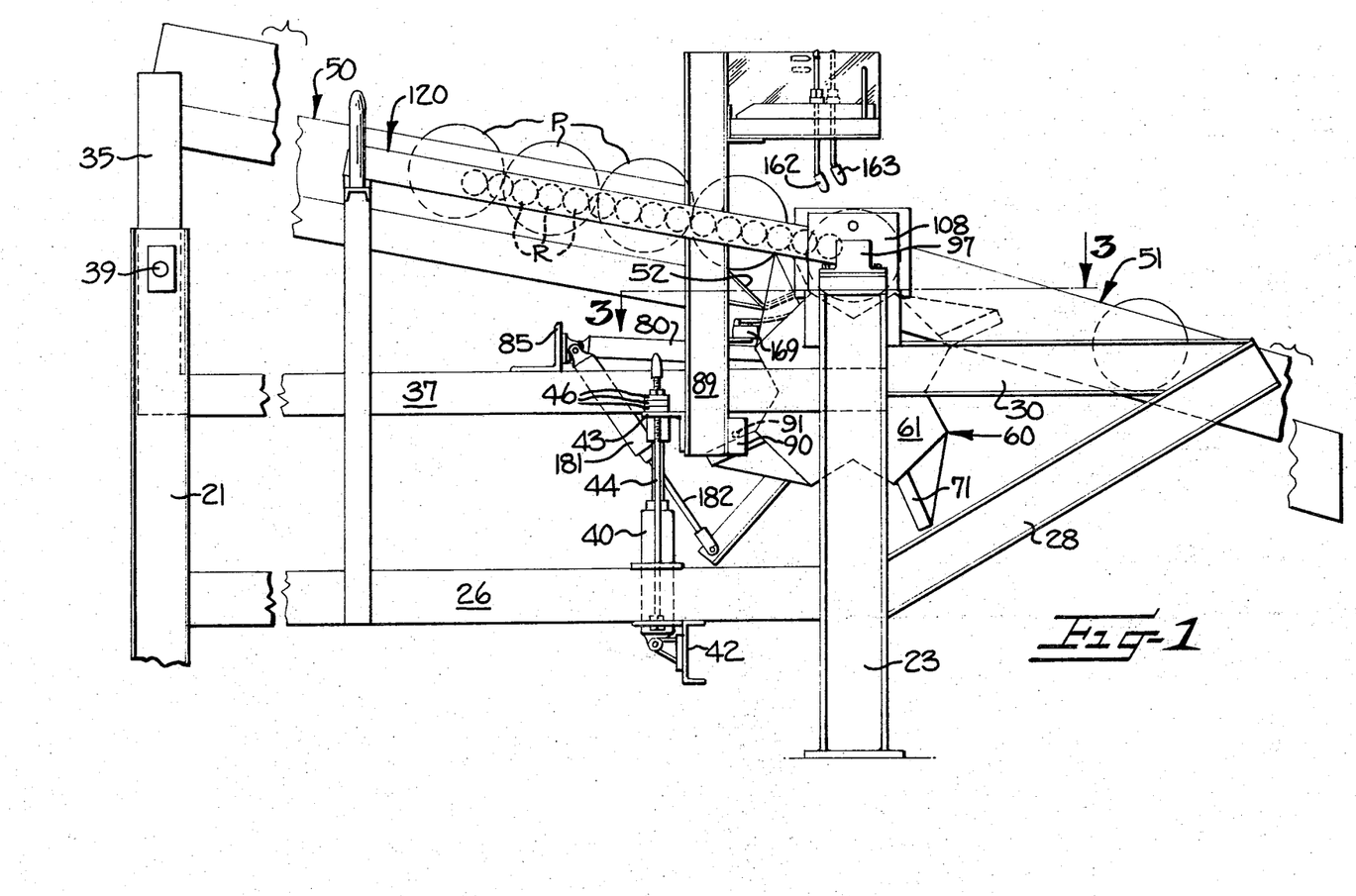
FIG. 1 is a side elevation of an apparatus for preparing packages of yarn for subsequent treatment in accordance with the present invention.
Figures 2, 5:
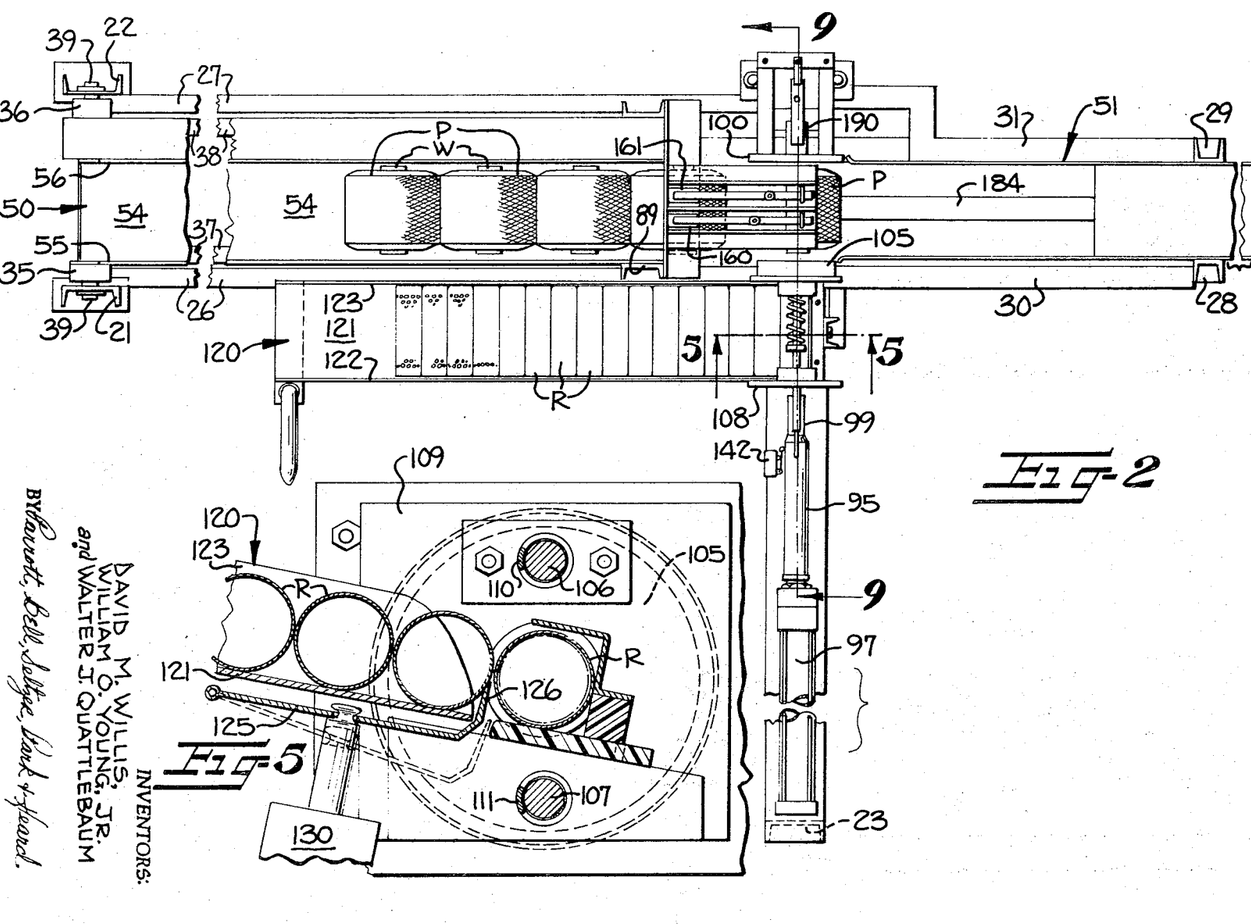
FIG. 2 is a plan view of the apparatus of FIG. 1.
FIG. 5 is an enlarged elevation, in partial section, of a portion of the apparatus of FIG. 1, taken generally along the line 5—5 in FIG. 2.

In order to support the various operating instrumentalities of the apparatus of the present invention, and to permit adaptation of the apparatus to packages of various sizes, the apparatus includes a stationary supporting frame adapted to be mounted on a workroom floor and a movable frame interconnected to the stationary frame for adjustment relative thereto. The stationary frame includes vertical standards 21–25 and elongate stringer members 26–31 secured to the vertical standards and extending therefrom (FIGS. 1 and 2). One pair of vertical standards 21 and 22 adjacent one extremity of the apparatus, are the location of an interconnection of the stationary frame with a movable frame including vertical members 35 and 36 and horizontal members 37 and 38. A horizontally disposed shaft 39 extends through the stationary vertical standards 21 and 22 and movable members 35 and 36 to define a horizontal axis for pivotal movement for the movable frame.

The angular position of the movable frame relative to the stationary frame, and thus the alignment of the free end of the movable frame (to the right in FIG. 1) with the stationary frame, is governed by a resilient biasing means and an opposing restraining means. Preferably, the resilient biasing means takes the form of a pair of air cylinders 40 and 41, each of which has one extremity secured to a horizontal member 42 extending transversely of the stationary frame and the other extremity engaging a horizontal member 43 secured to the movable frame to urge the same upwardly when air pressure is applied to the cylinders during operation of the apparatus. In opposition to the upward urging force developed and applied by the biasing means 40 and 41, a pair of tension rods 44 and 45 engage the stationary and movable frames to limit upward movement of the movable frame in response to the biasing force by exerting a restraining force. A number of removable spacers 46 are interposed between the movable frame and the upper extremities of the tension rods 44 and 45 engaged therewith, with the number of spacers 46 being varied to determine the angular position of the movable frame about the pivot axis 39.

APPARATUS OPERATING INSTRUMENTALITIES

In order to provide for receiving a plurality of packages of yarn and for moving the packages along a predetermined common path of travel and past a core replacement station, this invention provides means including upper and lower package troughs and a rotatably supported package advancing means. The package troughs include an upper package trough 50, supported on and movable with the movable frame, and a lower package trough 51, supported on the stationary frame. A plurality of finger members 52, mounted beneath the floor 54 of the trough 50 to project forwardly adjacent the lower extremity thereof, define a pocket at the lower end of the trough 50. The width of the floor 54 of the trough 50 and the vertical extent of the sidewalls 55 and 56 thereof are such that packages P of yarn are received in the upper trough 50 in a predetermined common orientation, with the winding cores W thereof in a horizontal disposition, and are advanced by gravity along a predetermined common path of travel to a dispensing position defined by the scooped finger members 52. When a package P reaches the dispensing location at the pocket formed by the finger members 52, it is in position to be received by a package advancing means and advanced thereby in continued movement along the predetermined path.

Figure 3:
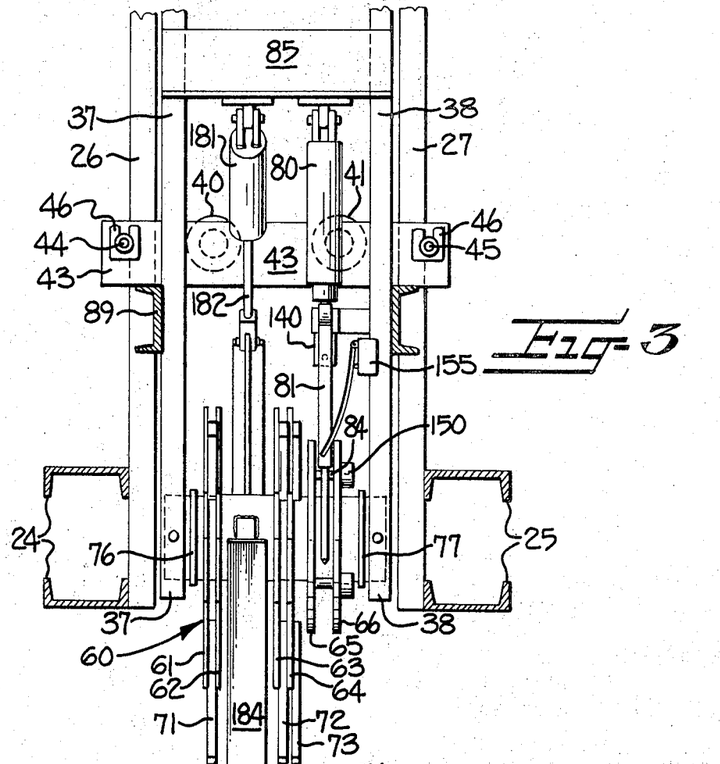
FIG. 3 is a plan view, partly broken away, of a portion of the apparatus of FIGS. 1 and 2, taken generally along the line 3—3 in FIG. 1.
Figure 4:
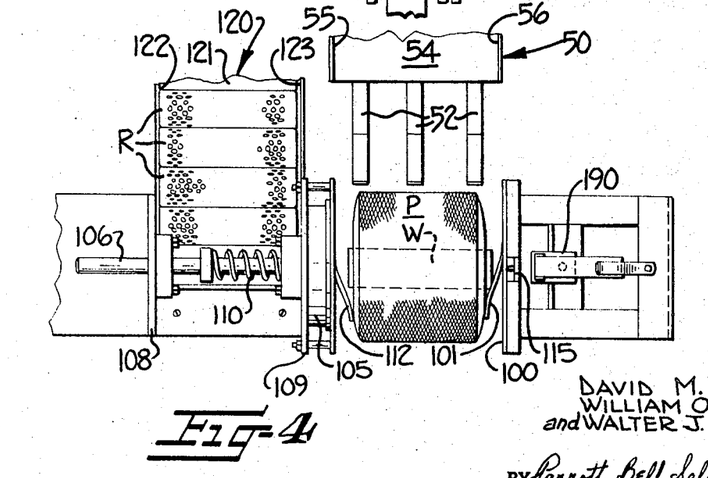
FIG. 4 is an enlarged view similar to FIGS. 2 and 3, illustrating one step in the operation of the apparatus of FIG. 1.
Figure 6:
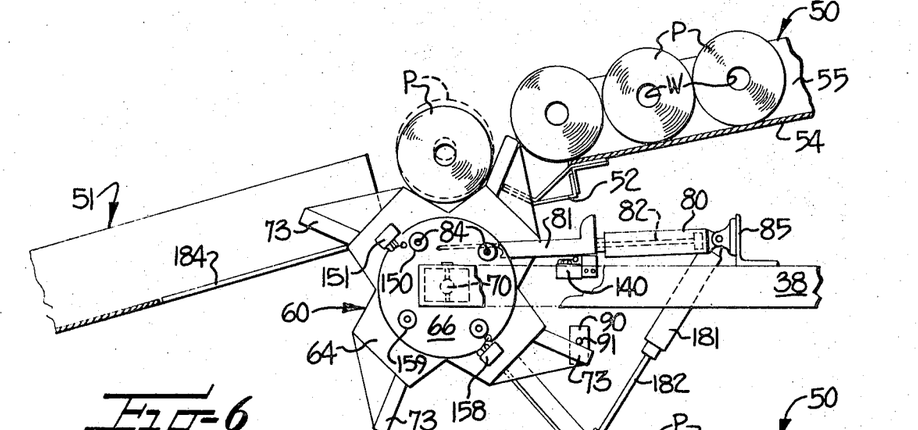
FIG. 6 is a partially schematical elevation of a portion of the apparatus of FIG. 1 at one stage in the advancement of a package of yarn.
Figures 7, 8:
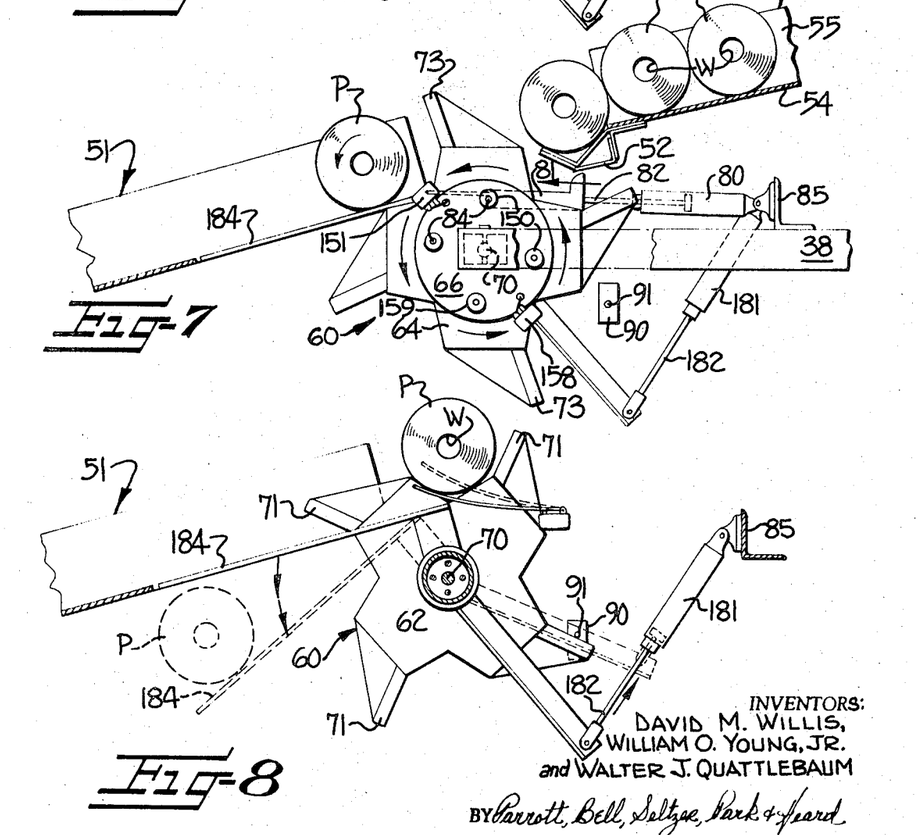
FIG. 7 is a view similar to FIG. 6 illustrating a further progression in the advancement of a package of yarn.
FIG. 8 is a view similar to FIGS. 6 and 7 illustrating the rejection of a package of incorrect size for core replacement.
Figure 14:
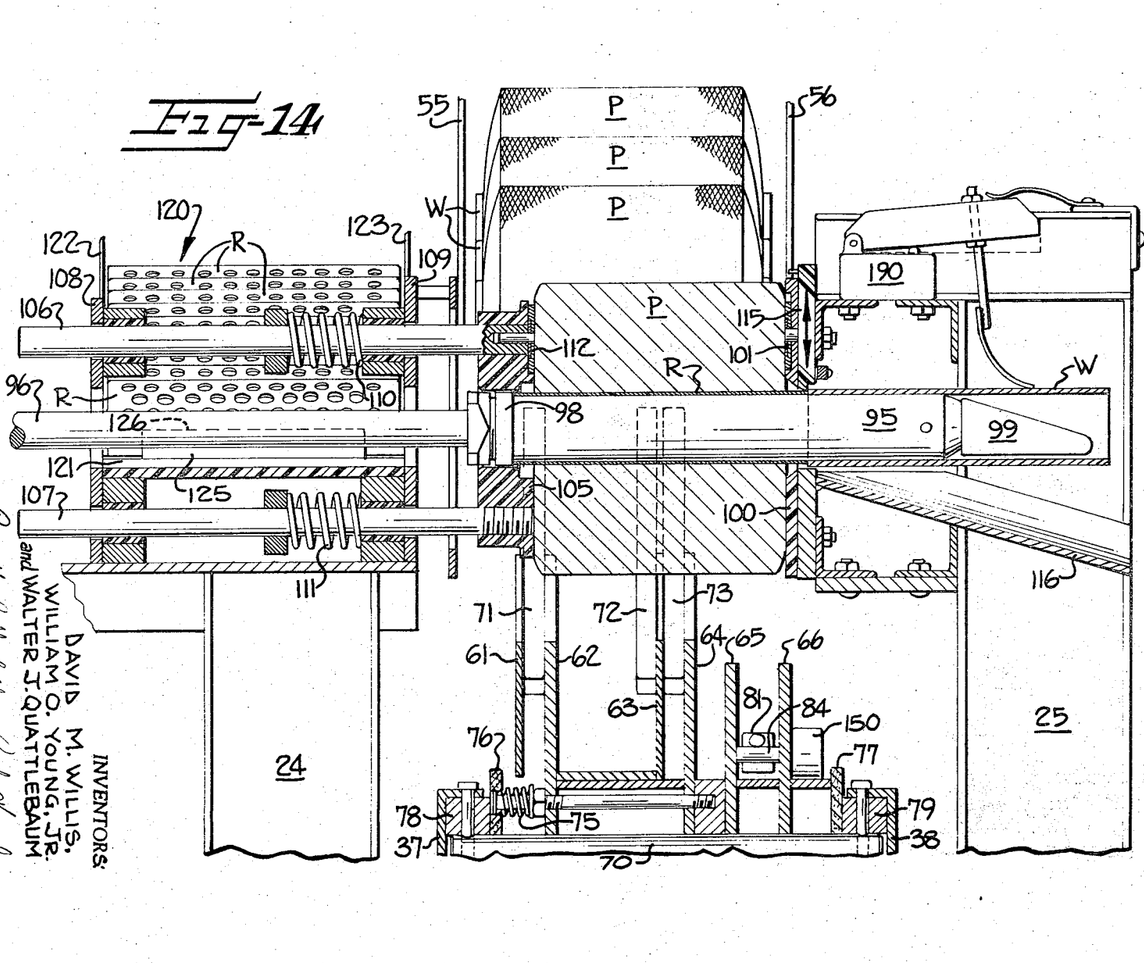
FIG. 14 is an enlarged section view through a portion of the apparatus of FIG. 1 at a stage in core replacement corresponding to that illustrated in FIG. 12.

In order to controllably advance individual packages from the package dispensing location at the extremity of the upper trough 50 along the common path of travel and past a core replacement station, this invention provides package advancing means including a rotatable member 60. The rotatable member 60 is formed by a plurality of plates 61, 62, 63, 64, 65 and 66, some of which are generally cross-shaped or of lobed configuration such as plate 61 and others of which are circular such as plate 66, secured together and mounted for rotation about a stationary central shaft 70 fixed to the forward extremity of the horizontal members 37 and 38 of the movable frame (FIGS. 3 and 14). Each of the cruciform plates 51–64 has a plurality of lifting fingers 71, 72 and 73 secured thereto and projecting outwardly therefrom at circumferentially spaced apart locations and rotatable member 60 is so supported and arranged relative to the trough finger members 52 that, upon rotation of the member 60, the lifting fingers 71–73 pass through interstitial spaces between the trough finger members 52, to lift a package P from the dispensing location and receive the same into a pocket defined between two projecting portions of the cruciform plate members 61–64 (FIGS. 6 and 7).

Control over the rotation and position of the rotatable member 60 is maintained in part by the plates 61–66 composing that member being restrained against entirely free rotation about the shaft 70. Instead, a plurality of biasing springs 75 provide a longitudinally directed force acting to expand a pair of frictional face members 76 and 77 outwardly against opposing stationary friction surface members 78 and 79 (FIG. 14). The rotation retarding force thus developed is adjusted by varying the force exerted by the springs 75, so that the rotatable member 60 may be indexed when driven as hereinafter described but is not so freely rotatable as to become displaced by a core replacement operation.

In order to drive the rotatable member 60 in rotation as required and to positively locate a pocket thereof at a core replacement station, this invention provides advancing driving means including an advancing means cylinder 80 and a pushing bar 81 operatively secured to a piston rod 82 moving within the cylinder 80. The pushing bar 81 has an extended leading end and a pushing socket intermediate its length, which cooperate with a plurality of cross-bars 84 extending between the two circular plates 65 and 66 which are secured together with the cruciform plates 61–64 to form the rotatable member 60. The mounting of the advancing means cylinder 80 and the thickness of the pushing bar 81 additionally cooperates with the plurality of cross-bars 84 to positively locate the rotatable member 60 in a desirable position by engagement of the lower surface of the pushing bar 81 with a cross-bar 84 as the rotatable member 81 is rotated to the desired position. The socket of the pushing bar 81 is configured to engage a cross-bar 84 by extending partially therearound and, upon extension of the piston rod 82 and pushing bar 81 by the admission of pressure fluid to the advancing means cylinder 80, the rotatable member 60 is driven into rotation until the next following cross-bar 84 engages the lower surface of the pushing bar 81 and further rotation of the rotatable member 60 is blocked. Thereafter, retraction of the pushing member 81 withdraws the pushing socket to a position adjacent the next circumferentially spaced connecting bar 84, while the lower surface of the pushing bar 81 and the extended extremity thereof assure that operative engagement with the rotatable member 60 is maintained during the retraction movement and that the pushing socket is returned to proper alignment for engagement with the next adjacent cross-bar 84. The extremity of the fluid actuation cylinder 80 remote from the pushing member 81 is pivotally connected to transverse brace 85 secured to the movable frame members 37 and 38, in order to permit a slight rising movement of the pushing member 81 as necessitated by the alignment of the machine elements (compare FIGS. 6 and 7).

In order to further assure that the rotatable member 60 is maintained with a package receiving pocket in the predetermined position locating a package P in the core replacement station, this invention provides a third means for blocking rotation of the rotatable member 60 after the pushing bar 81 has been retracted. More particularly, a suitable fluid pressure cylinder 90 is mounted on a vertical member 89 secured to the horizontal member 37 of the moving frame in such a position that the piston rod 91 thereof is projected outwardly to intercept the path of the lifting fingers 71–73 of the rotatable member 60 upon application of fluid pressure to the cylinder 90 (FIG. 6). With engagement of the piston rod 91 with a lifting finger 73 of the rotatable member 60, further forward rotation of the rotatable member 60 is blocked. Due to the use of a properly sized air cylinder 80 to drive the rotatable member 60 in rotation, such positive blocking of rotation does not result in injury to the operating instrumentalities of the apparatus. Instead, a positive determination of the position of a package P received in one of the pockets of the rotatable member 60 is readily affected.

The importance of the positive location of a package P at a core replacement station, as for example by blocking the rotation of the rotatable member 60, becomes more clear in view of the provision in the apparatus of a core replacing means, in order to expell a winding core W from within a package P while inserting a replacement core R thereinto. Preferably, the core replacing means takes the form of a mandrel member 95 (FIGS. 9–12 and 14), mounted on one terminal extremity of a piston rod 96 of a core replacement cylinder 97 and supported for movement along a predetermined path transverse to the common path of travel to the packages P. The predetermined path of travel for the mandrel member 95 extends between two extreme positions, one of which is remote from the core replacement station at the intersection of the mandrel path with the common path of travel of the packages P (FIG. 9), and the other of which positions the mandrel member 95 penetrating a package P (FIG. 12) at the core replacement station. Movement of the mandrel member 95 between the two extreme positions results from the application of fluid pressure to the core replacing cylinder 97, which is supported on the stationary frame standards 23 and 24 with the mandrel member 95 aligned for intersection of the package path as described above.

It is the necessity of aligning the mandrel member 95 with the winding core W of a package P at the core replacement station which requires the provision of the movable frame and the support of the rotatable member 60 at the forward extremity thereof. More particularly, vertical displacement of the rotatable member 60, by adjustment of the number of spacer blocks 46 inserted between the upper extremity of the tension rods 44 and 45 and the movable frame cross member 43, permits accommodating packages P of varying overall diameters, by positioning of the winding cores W in correct alignment for core replacement upon reciprocation of the mandrel member 95.

Figure 11:
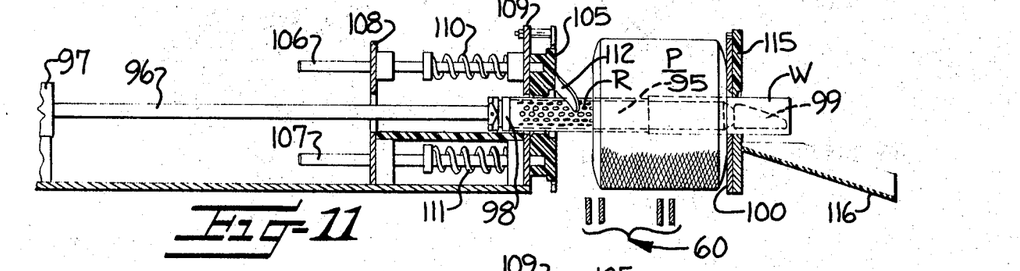

In movement between the two extreme positions along the predetermined path of mandrel travel, the mandrel member 95 enters first into a replacement core R. In one operating embodiment of the present invention, the replacement core R is a longitudinally rigid core made, for example, of stainless steel tubing having a perforated wall. With such a longitudinally rigid core, the mandrel member 95 may be of a reduced diameter throughout substantially its entire length, to penetrate into the replacement core R and the winding core W. Adjacent the remote extremity of the mandrel member 95 is a shoulder portion 98, of sufficiently large diameter to engage one extremity of the replacement core R and push the replacement core toward the package P as the mandrel member 95 enters into the winding core W. In order to assure accommodation of a limited range of sizes for the package P, the mandrel member 95 also includes, at the forward extremity thereof a tapered portion 99 faced with low friction material which, on entrance onto a winding core W raises the package P undergoing core replacement a distance as much as one inch from the pocket of the rotatable member 60 (phantom lines in FIG. 6 and compare FIGS. 9 and 10). Upon advancement of the mandrel member 95 so that the tapered portion 99 penetrates the replacement core and enters the winding core W, the package is displaced laterally into engagement with a side plate 100 faced with low friction material, against the minor biasing force of a centering spring 101. With firm lateral support for the package P, further extension of the mandrel member 95 causes the tapered portion 99 to lift the package P onto the main body of the mandrel member, pushes the leading end of the replacement core into engagement with the winding core W, and expels the winding core W from within the package P as the replacement core R is inserted thereinto (FIG. 11).

Figures 12, 13:
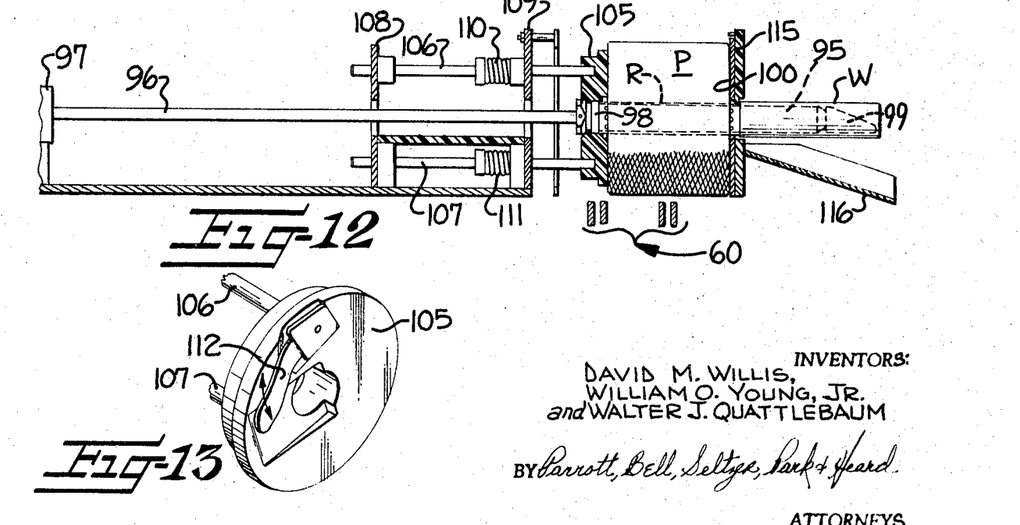
FIG. 13 is a perspective view of a portion of the apparatus of FIG. 1, illustrating a centering spring device for engaging a package of yarn.

In order to break the package P by compressing the same longitudinally of the replacement core R, and thereby assure more uniform density of the package, the apparatus is provided with a movable side plate 105, having a low friction face and supported by a pair of spaced bearing rods 106 and 107 which extend through a spaced pair of supporting plate members 108 and 109 to be guided thereby in linear movement. The movable side plate 105 is biased to a normally withdrawn position by a pair of biasing springs 110 and 111 encircling the supporting rods 106 and 107 (FIGS. 9–11) and carries a second centering spring 112 similar to the spring 101. The hole within the movable side plate 105 which is penetrated by the mandrel member 95 and replacement core R during core insertion is so sized that the side plate is engaged by the enlarged terminal extremity portion 98 of the mandrel member 95 upon completion of core replacement. Upon such engagement, and with the completion of core replacement, the movable side plate 105 is forced against the package P to apply a compressive force thereto longitudinally of the replacement core (FIG. 12).

In order to assure proper stripping of the expelled winding core W from the mandrel member 95, and to prepare the package P for further advance along the common path of travel from the core replacing station, this invention provides a vertically sliding latch member 115 in the stationary side plate 100 (FIG. 14). The sliding latch member 115 moves upwardly upon expulsion of the winding core W, but is free to slide downwardly by gravity and engage the trailing end of the expelled winding core W upon expulsion thereof from the package by the mandrel member 95. Upon subsequent withdrawal of the mandrel member from the package P, the expelled winding core W is prevented from movement back into the package P by the latch member, and falls to a discharge chute 116. On withdrawal of the mandrel member 95, the movable side plate 105 is released to return to its normal biased position, and the force of the centering springs 101 and 112 carried in the sidewalls of the apparatus at the core replacing station returns the package P to a centered position in the pocket of the rotatable member 60. Thereafter, the package P is advanced to the lower chute 51 by further rotation of the rotatable member 60 (as in FIG. 7).

Figure 9:
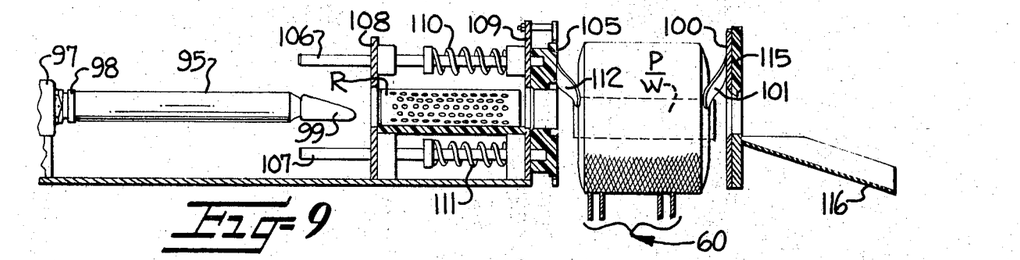
FIGS. 9, 10, 11 and 12 are partially schematic elevations illustrating the successive steps in replacement of a package core in accordance with the present invention.
Figure 10:
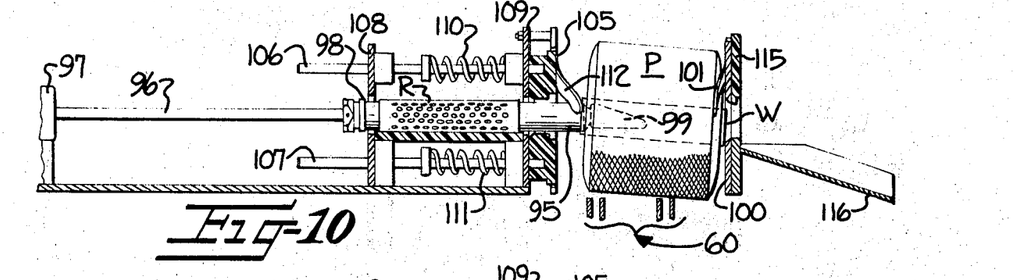

In order to assure a continuing supply of replacement cores R for the operation of the apparatus, this invention provides means for receiving and storing a plurality of the replacement cores. More particularly, a replacement core trough 120 adjacent the core replacement station has a floor 121 and sidewalls 122 and 123 sized to receive a plurality of such cores R in a predetermined common orientation, and to feed such replacement cores R by gravity flow to a dispensing position in alignment with the mandrel member 95 when the same is in the withdrawn position (FIGS. 5 and 9). In order to assure that the next succeeding replacement core is not engaged by the rearward extremity of the mandrel member 95 as the mandrel member is retracted from the core replacement station, a gate control member 125 is provided which has a vertically upstanding lip portion 126 penetrating the floor 121 of the replacement core feed trough 120 (FIG. 5). The position of the upstanding lip 126 is controlled by a suitable actuator cylinder 130, and coordinated to extension and retraction of the mandrel member 95 so as to assure that only a single replacement core R is presented as required and in coordination to the other operations of the apparatus.

CONTROL SYSTEM AND NORMAL SIZE PACKAGE OPERATION

A pressure fluid control system (FIGS. 15 and 16) preferably is employed to actuate the various operating instrumentalities described above, in order to avoid the difficulties possibly present in an electrical actuation system and obtain the benefits of resilient operating forces where such forces are preferred while assuring proper sequential operation of the various operating instrumentalities. The control system is responsive to the presence or absence of packages P moving along the predetermined common path of travel, and correctly coordinates the rotation of the package advancing member 60, the extension and retraction of the mandrel member 95, and the release of replacement cores R to assure that the winding cores of packages of proper size for accommodation by the apparatus are replaced with replacement cores while packages of other sizes are rejected without actuation of the core replacing means.

Prior to describing the detailed operation of the fluid pressure control system, it is pertinent to point out the various responses which are required. In order to achieve the desired efficiency of operation, the apparatus must proceed with the replacement of winding cores in packages of proper size for so long as such replacement is possible. For this reason, the operation of the apparatus must not be interrupted solely because a package of incorrect size is presented for core replacement or some other unexpected operating condition arises. More particularly, the cycle of advancing a single package from the upper trough 50 to the core replacement station and subsequently advancing the package from the core replacement station to the lower trough 51 must proceed regardless of replacement of the core of the package advanced. However, in order to promote efficiency, it is preferred that packages of incorrect size for core replacement be diverted from this common path of travel. With these ends in view, the control system hereinafter described operates in multiple modes. As discussed immediately hereinafter, it is assumed that the cycle of operation has been initiated and is proceeding solely in response to movements of the operating instrumentalities.

The first mode encompasses the normal cycle of operation of the apparatus, wherein a package of proper size for core replacement is presented at the core replacement station and the winding core thereof is replaced with a replacement core. With the pushing bar 81 in the retracted position, the lower surface thereof engages a first advancing means trip valve 140, and displaces the spool thereof to admit air from a source of pressurized air to a conduit 141a. The application of air pressure to the conduit 141a applies pressure to an input port of a first mandrel position trip valve 142 which is responsive to the position of the mandrel member 95. Should the trip valve 142 sense that the mandrel member 95 is withdrawn from a package and clear of the rotatable member 60, the pressure present in the conduit 141a is admitted to an extension conduit 141b thereof, to flow through a cycle stop valve 143 and a cycle start valve 144 (discussed hereinafter) to and through further extension conduits 141c and 141d to a pilot piston at one extremity of the spool of a four-way advancing means pilot valve 145, thereby displacing the spool thereof (toward the right in FIG. 15). At the same time, a pressure signal is applied through the conduit 141b to a pilot piston at one extremity of the spool of a three-way blocking and core gate pilot valve 146 to displace the spool thereof. Upon displacement of the spool of the advancing means pilot valve 145, air is admitted from a suitable source to a conduit 148 leading to the advancing means cylinder 82, to result in extension of the pushing bar 81 for engagement with a cross-bar 84 of the rotatable member 60 to drive the member in rotation. Displacement of the spool of the blocking and core gate pilot valve 146 assures that a conduit 149 communicating with the blocking cylinder 90 and core gate cylinder 130 is open to an exhaust, pressure is thus relieved from those cylinders, and the piston rods thereof are withdrawn. As the pushing bar 81 is extended, it rises from contact with the first advancing means trip valve 140, and the spool thereof is returned by a biasing spring to a flow cut-off position. Pressure is then exhausted through the conduits 141a–141d from the pilot pistons of the advancing means pilot valve 145 and the blocking and core gate pilot valve 146. As the rotatable member 60 is advanced through five degrees of rotation, a cam 150 secured adjacent an extremity of a cross-bar 84 engages a first rotatable member trip valve 151 and displaces the spool thereof to admit air from a suitable source to a conduit 152. The admission of air pressure to the conduit 152 applies a pressure signal to pilot pistons at the extremities of the operating spools of two three-way valves, namely first and second transfer pilot valves 153 and 154, displacing the spools thereof (toward the right in FIG. 16). Further advancement of the pushing bar 81 results in engagement of an upward projection thereof with a second advancing means trip valve 155. Displacement of the spool thereof admits air pressure from a suitable source to a conduit 156a making such pressure available at the input port of a second rotatable member trip valve 158, positioned adjacent the rotatable member for actuation by a cam 159 upon the member 60 being rotated until a package P conveyed thereby has reached the core replacement station and is aligned with the mandrel member 95.

In order to actuate the operating instrumentalities of the apparatus in coordination with the presentation of a package of predetermined size, this invention includes means for sensing the size of the packages P, which means preferably comprises first and second package sensing valves 160 and 161, supported on the movable vertical members 88 and 89 to overlie the predetermined common path of travel for the packages P and including respective depending actuating lever arms 162 and 163 which terminate closely adjacent the core replacement station. The lower terminal extremities of the valve actuating lever arms 162 and 163 are located to be engaged by certain packages upon lifting thereof from the dispensing location in the trough fingers 52 by the lifting fingers 71–73 of the rotatable means 60. If the package is of correct size for core replacement, one of the valve actuating levers is engaged and the first package sensing valve 160 is operated. If the package is of too large a size for correct alignment of the winding core thereof with the mandrel member 95 at the core replacement station, both of the valve actuating levers 162 and 163 are engaged and both of the first and second package sensing valves 160 and 161 are actuated. Should the package be of too small a size for correct alignment with the mandrel member 95, neither of the valve actuating levers is engaged. The co-operation of the valves 160 and 161 as so actuated by various sizes of packages P with the other operating instrumentalities of the apparatus will become more clear hereinafter, when the detailed operation of the fluid control system in all modes of operation has been described.

As rotation of the rotatable member 60 continues, a package P is received from the trough fingers 52 and lifted by the lifting fingers 71–73 to actuate the first package sensing valve 160. Displacement of the spool of the first sensing valve admits air from a suitable source to a conduit 165 and thence applies a signal to an input port of the first transfer pilot valve 153. Due to the position of the spool of the transfer valve, the pressure signal is passed through the valve to a conduit 166 and applied to a pilot piston at one end of the spool of a third transfer pilot valve 168 to displace the same (toward the right in FIG. 16). The package P carried in the pocket of the rotatable member 60 also acts on a third package sensing valve 169, to displace the spool thereof and establish communication between two branches 156b and 156c of the conduit 156a to which pressure has been applied by the second advancing means trip valve 155.

Upon further rotation of the rotatable member 60 to advance a package P to the core replacement station and into alignment with the mandrel member 95, the second rotatable member trip valve 158 is actuated and the pressure present in the input conduit 156a thereto is admitted to the branch conduits 156b and 156c, to be applied to input ports of the third transfer valve 168. The pressure signal applied to the valve 168 through the branch conduit 156c is passed to flow through a conduit 170 to a manual mandrel advance valve 171 and thence through a conduit 172a to a replacement core trip valve 174 positioned adjacent the mandrel member 95. The signal applied to the valve 168 through the branch conduit 156b is blocked by the displacement of the spool which earlier resulted from the application of a pressure signal to the pilot conduit 166. An actuator element of the trip valve 174 extends adjacent the mandrel member 95, to sense the presence or absence of a replacement core thereon, and in the absence of a replacement core on the retracted mandrel member 95, the pressure signal passed through the valve 168 from the conduit 156c is passed through a branch conduit 172b to a second mandrel position trip valve 175. Should a replacement core be present on the retracted mandrel member 95, that core has been withdrawn from the package P leaving the package coreless, and operation of the apparatus should be interrupted. The second position valve 175 is engaged by the mandrel member 95 and, in the event that the mandrel member 95 is fully and properly retracted, the spool thereof is displaced to admit the pressure signal from the conduit 172b to a pilot piston of a four-way core replacement pilot valve 178 through a branch conduit 172c. With the spool of the core replacement valve 178 displaced (toward the right in FIG. 16), air is applied from a suitable source to a conduit 179 communicating with the core replacement cylinder 97 to move the mandrel member 95 toward the common path of travel of the packages P, through a replacement core R in the replacement magazine, and thereby replace the winding core W in the package.

Upon application of air pressure to the conduit 179, such pressure is applied to the pilot pistons of the three-way blocking and core gate pilot valve 146 and a reject gate pilot valve 180. Upon displacement of the spool of the blocking and core gate valve 146, air is applied from a suitable source to the conduit 149 communicating with the blocking cylinder 90 and the replacement core release gate cylinder 130. With such application of pressure, further rotation of the rotatable member 60 is blocked by the piston rod 91 as the mandrel member 95 is extended in the core replacing operation, and the gate 125 of the replacement core magazine is raised to prevent the entanglement of a second replacement core with the mandrel member 95. At the same time, the pressure present in conduit 179 is applied to pilot pistons of the reject gate pilot valve 180 and the second transfer pilot valve 154, to displace the spools thereof (to the left in FIG. 16). The displacement of the spool of the second transfer valve 154 blocks the conduit 201 and opens one pilot piston of the reject pilot valve 180 to the atmosphere as pressure is applied to the opposite pilot piston of that valve, to displace the spool thereof. Displacement of the spool of the reject pilot valve 180 controls the application of air from a suitable source to a reject gate cylinder 181. Through a suitable linkage, the reject gate cylinder piston rod 182 controls the position of a floor portion 184 of the lower package trough 151 which is supported for rotation about the fixed shaft 70. With pressure applied to extend the piston rod 182, the floor portion 184 is maintained in an elevated position to receive a package next subsequently advanced by the rotatable member 60 and assure continued guidance thereof along the predetermined common path of travel (FIG. 7).

Upon expulsion of a winding core W from the package P, the expelled core engages an actuating element of an expelled core trip valve 190, displacing the spool of that valve and opening an operative communication between a pair of conduits 191 and 192a. The conduit 191 communicates with the spool of a third mandrel position trip valve 194, which valve is engaged by the movable side plate 105 as the mandrel member 95 reaches the fully extended position, and with the second package sensing valve 161. Upon displacement of the spool of the third mandrel trip valve 194, air is admitted from a suitable source to the conduit 191, to pass through the expelled core trip valve 190 to the conduit 192a, through a pair of manually actuable advancing means control valves 195 and 196, and thence to be applied to a pilot piston of the advancing means pilot valve 145. Application of such pressure to the pilot piston reverses the position of the spool thereof and results in the admission of air to a conduit 198 communicating with the advancing means cylinder 80 to retract the pushing bar 81, actuate the first advancing means trip valve 140, and admit pressure to the conduit 141a to begin initiation of a succeeding cycle. Pressure in the conduit 191 is also applied to a pilot piston of the core replacement pilot valve 178, to reverse the position of the spool of that valve and result in the application of pressure from a suitable source to a conduit 199 communicating with the core replacement cylinder 97 for retraction of the mandrel member 95, and through the second package sensing valve 161 and conduit 200 to a pilot piston of the third transfer valve 168 so as to relieve the opposite pilot piston of the core replacement valve 178 to an exhaust. The conduit 179 is simultaneously opened to exhaust and, upon retraction of the mandrel member 95 to clear a package and the rotatable member 60, the first mandrel position trip valve 142 passes the pressure in the conduit 141a to the connecting conduit 141b to reverse the spool position of the blocking and core gate pilot valve 146, and the replacement core gate and rotation blocking means are withdrawn.

The operation of the first advancing means trip valve 140 and the first mandrel position trip valve 142 is such that continuing cycles of operation of the apparatus overlap, in that air is admitted to the advancing means cylinder 82 to initiate rotation of the rotatable member 60 prior to full retraction of the mandrel 95. Such overlapping of the cycle of operation facilitates obtaining a higher production rate for the apparatus. An additional detail of the cycle of operation involves the second transfer valve 154, which controls the spool displacement of the reject gate pilot valve 180 so as to maintain the reject gate in the closed position until it is required that the gate be displaced to segregate an abnormal size package, as described hereinafter.

ABNORMAL SIZE AND ABSENT PACKAGE OPERATION

The discussion of the control system and operation of the apparatus given heretofore has assumed that only the first package sensing valve 160 was actuated upon a package P being lifted from the dispensing location at the finger members 52 by the lifting fingers 71-73 and advanced to the core replacing station. Operation of the system in the event that an oversize or undersize package is presented for core replacement will now be briefly described.

In the event that the package P presented for core replacement is oversize, both of the first and second package sensing valves 160 and 161 are actuated. Upon actuation of the second sensing valve 161, pressure from a suitable source is admitted to a conduit 200 to be applied to a pilot piston of each of the first and third transfer pilot valves 153 and 168, returning the spools of those valves to the positions indicated in FIG. 16 and thereby blocking the pressure signals which would otherwise be applied to a pilot piston of the core replacement pilot valve 178. By blocking such a signal otherwise applied to this pilot piston, pressure fluid is not applied to the core replacement cylinder 97 to extend the mandrel member 95. Instead, the application of pressure to the conduit 156b on rotation of the rotatable member 60 to actuate the second rotatable member trip valve 158 results in such pressure passing through the third transfer pilot valve 168 to a conduit 201 and through the second transfer pilot valve 154 to a conduit 202 to be applied to a pilot piston of the reject gate pilot valve 180. Displacement of the spool of the reject gate pilot valve 180 resulting from such a signal (toward the right in FIG. 16) applies pressure to the reject gate cylinder 181 in such a manner as to pivotally lower the floor 184 of the lower package trough 51 (phantom lines in FIG. 8). At the same time, the pressure signal present in the connecting conduit 202 is transmitted through the expelled core trip valve 190 to the conduit 192a, and thence to the right-hand pilot piston of the advancing means pilot valve 145 to reverse the position of the spool of that valve. Upon return of the spool of the advancing means pilot valve 145 to the left-hand position, the pushing member 81 is retracted, and the next subsequent cycle of rotation of the rotatable member 60 is initiated without an intervening advancing movement of the mandrel member 95 having occurred.

In the event that an undersize package is advanced by the rotatable member 60, neither of the sensing valves 160 and 161 are actuated, and thus no pressure signal is applied to the left-hand pilot piston of the third transfer pilot valve 168. As a result, actuation of the second rotatable member trip valve 158, and the admission of a pressure signal thereby to the conduit 156b, results in blocking of an extension signal to the core replacement pilot valve 178, application of a package rejection signal to the reject gate pilot valve 180, and recycling of the advancing means pilot valve 145 all substantially as described above with reference to an oversize package.

MANUAL CONTROL PROVISIONS

Figure 15:
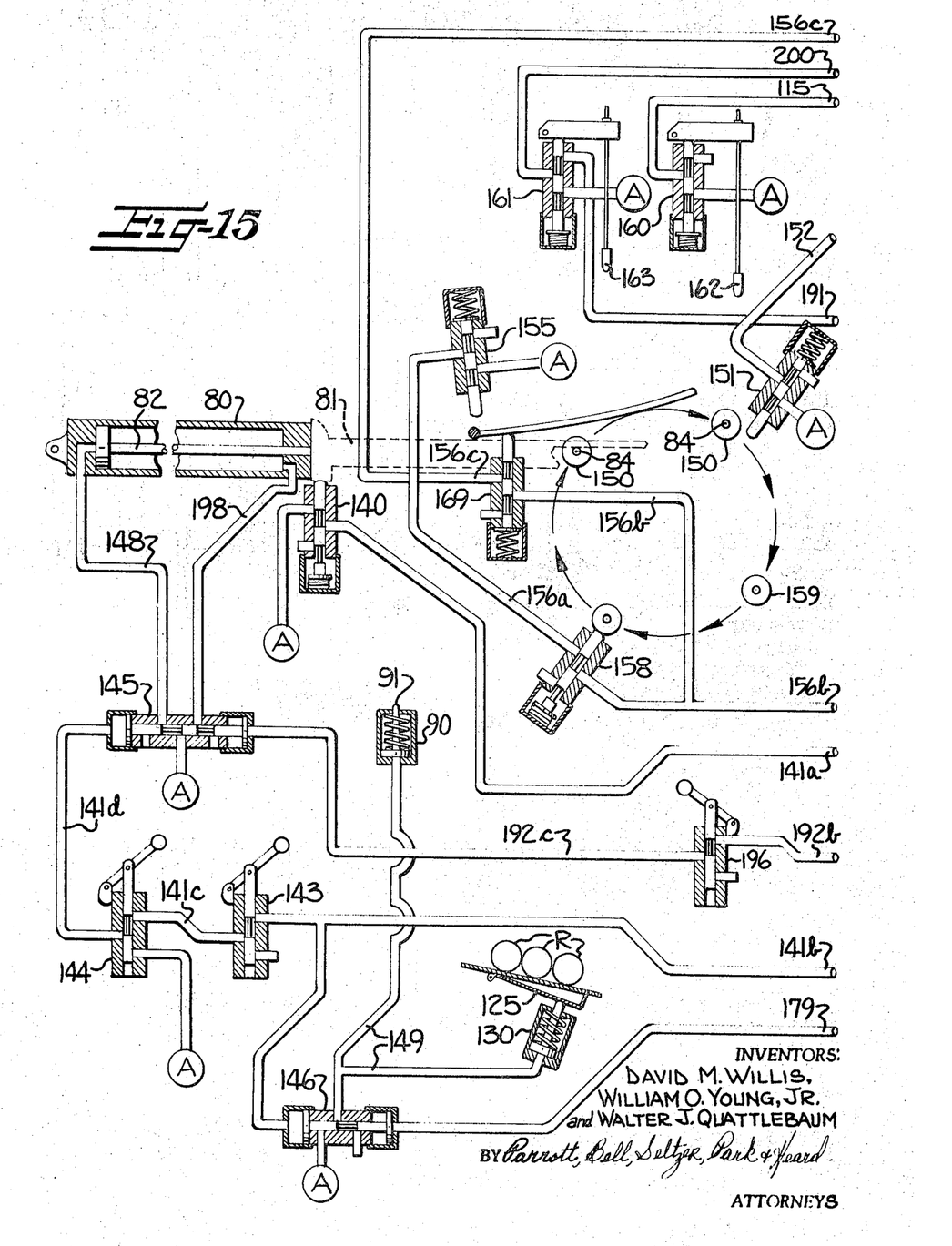
FIGS. 15 and 16 are partly schematic illustrations of a pneumatically actuated control system for the apparatus of FIG. 1.
Figure 16:
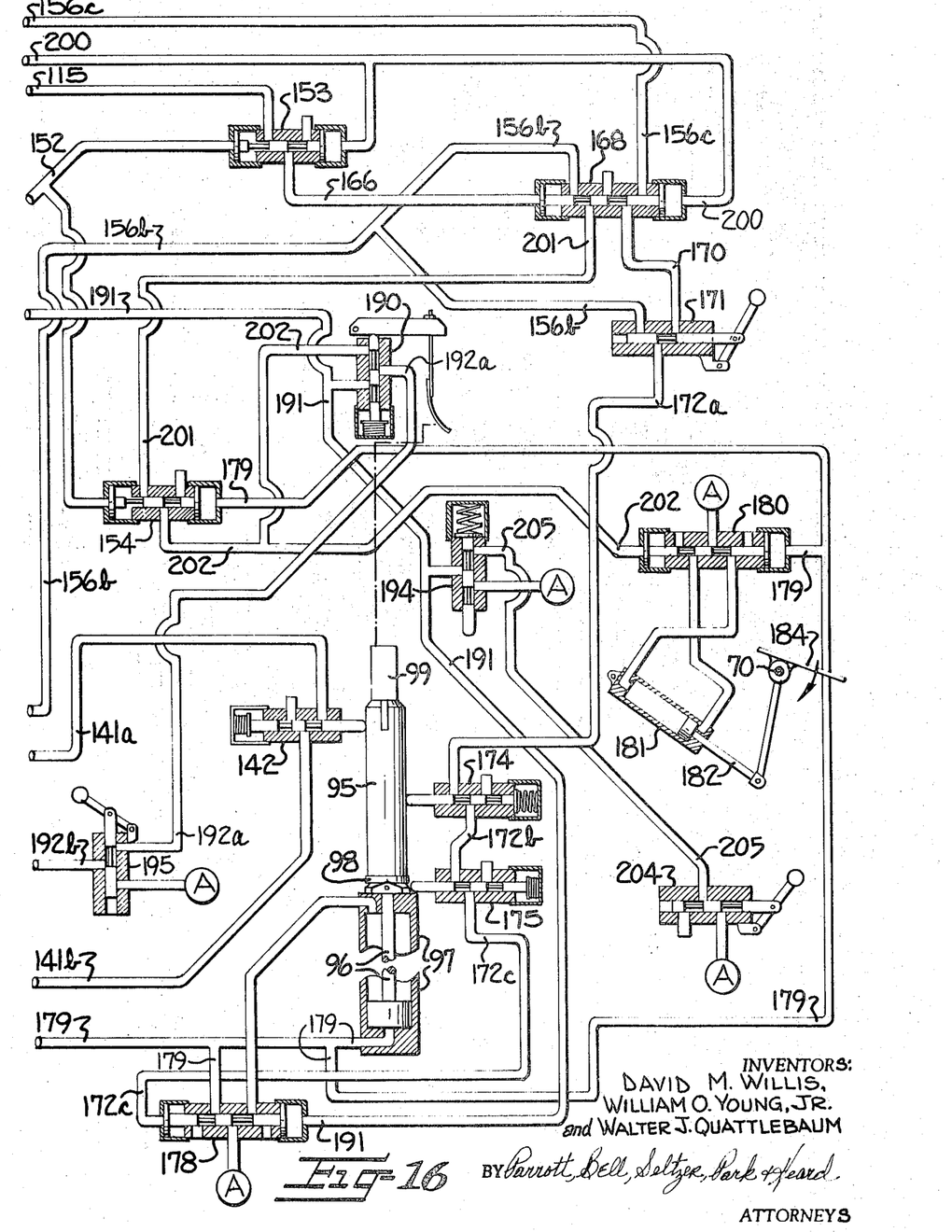
Figure 17:
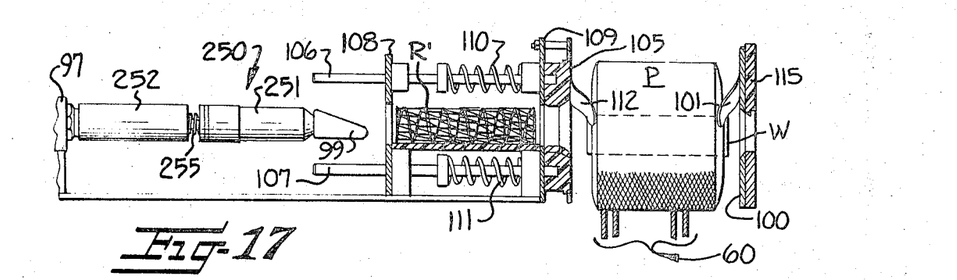
FIG. 17 is a view similar to FIG. 9 of a modified form of apparatus in accordance with this invention.
Figure 18:
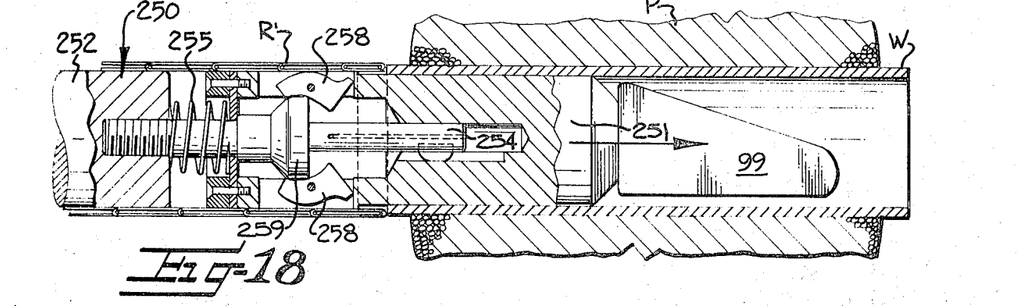
FIGS. 18 and 19 are enlarged partial section views similar to FIGS. 17 and 10 illustrating the successive steps in replacement of a package core by the modified apparatus of this invention.

During the sequential and automatic operation described above, the manually actuable valves 143, 144, 171, 195, 196 and 204 all remain in the conditions indicated schematically in FIGS. 15 and 16 and pass pressure signals as described above. These valves are provided in order to permit manual initiation or interruption of the automatic cycle as desired and other actuation of the operating instrumentalities as required to facilitate correction of the operation of the apparatus. More particularly, initiation of a cycle of machine operation is begun by manual actuation of the cycle start valve 144 to apply a pressure signal to the branch conduit 141d, while interruption of machine operation at the conclusion of a cycle is affected by manual actuation of the cycle stop valve 143 to hold that branch conduit open to an atmospheric exhaust. If it is desirable to advance the mandrel member 95 toward the core replacement station under manual control, the manual mandrel advance valve 171 may be actuated to apply a pressure signal to the conduit 172a from the conduit 156b. If manual control over the retraction of the manual mandrel member 95 is desired without regard to whether or not the mandrel has reached its extreme extended position, as when improper alignment of a package has caused the mandrel member 62 to improperly penetrate a winding core at the core replacement station, manual mandrel retraction valve 204 may be actuated to admit air from a suitable source to a conduit 205 to be passed through third manual mandrel position trip valve 194 to the conduit 191. Advancing means retraction valves 195 and 196 function, in a manner broadly similar to cycle start and stop valves 143 and 144, to control the pressure within branch conduit 132c so as to permit retention of the pushing member 81 in the extended position or controlled retraction thereof.

SPRING CORE INSERTION MODIFICATION

While the apparatus of this invention, as discussed hereinabove, is directed particularly to the replacement of a winding core W in a package P with a replacement core R which is longitudinally rigid, this invention additionally contemplates that the replacement cores may be of the spring core type which are considered desirable for certain textile operations. While a number of configurations of spring cores for textile yarn packages have heretofore been employed, a modification of the apparatus of this invention particularly intended for use of such cores will be disclosed in conjunction with an illustration of a longitudinally compressible core such as that disclosed in Annicq U.S. Pat. No. 2,614,764. However, it is to be understood that, while the apparatus of the present invention is illustrated as employed to insert a core of the illustrated type, the apparatus is additionally capable of inserting spring cores of other configurations, and the illustration of a particular configuration for the inserted spring core is not to be considered as limiting this invention.

A spring replacement core R' (FIGS. 17-20) of the type discussed above is distinguished from the longitudinally rigid replacement core R by the compressibility of the spring core. More particularly, if a pushing force were applied to the spring core in an effort to force insertion thereof into a package P, the spring core would be compressed longitudinally and the correctness of insertion of the core would become entirely unpredictable. In order to avoid this difficulty, this invention contemplates the use of a modified mandrel member 250 (FIGS. 17-20), particularly constructed for cooperation with a spring replacement core R'. In particular, a leading end portion 251 of the mandrel member 250 is supported in cantilever configuration from a trailing end portion 252 thereof by a central pin member 254 extending into a longitudinal cavity, so that the leading end portion 251 is movable longitudinally relative to the trailing end portion 252. A biasing spring member 255 is located between the trailing end portion 252 of the mandrel member 250 and the leading end portion 251, to normally bias the leading end portion 251 forwardly of and away from the trailing end portion 252.

In order to grip the leading coil of a spring replacement core R' and thereby pull the replacement core into the package P as the core replacement proceeds, this invention provides a pair of pivoting dog members 258 mounted on the leading end portion 251 of the mandrel member 250 for movement between retracted and extended positions. The position of the dogs 258 is controlled by a cam member 259 carried by the central pin 254 and engaging the inner extremity of the dog members 258. When the biasing spring 255 maintains the leading end portion 251 of the mandrel member 250 separated from the trailing end portion 252 (FIG. 18), the engagement of the cam member 259 with the dogs 258 maintains the dogs in their retracted position and the mandrel 250 is prepared for insertion through a spring replacement core R' and into a winding core W.

Figure 19:
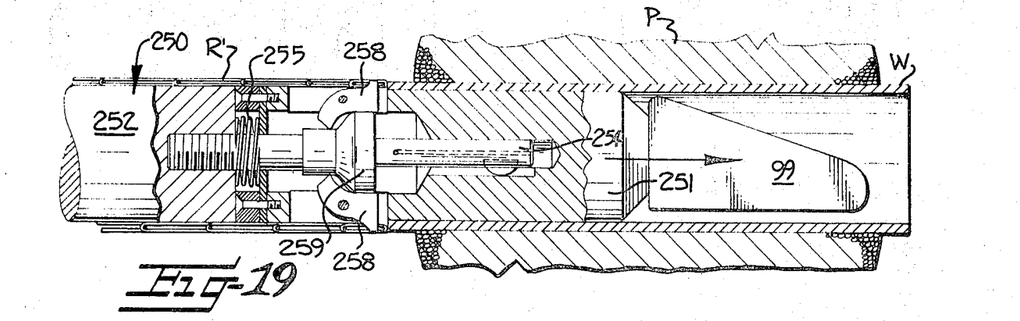
Figure 20:
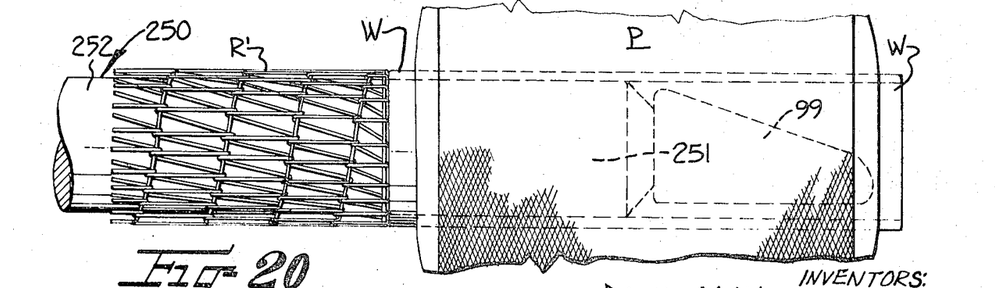
FIG. 20 is an elevation view similar to FIGS. 18 and 19.

Upon engagement of the winding core W with a shoulder at the rearward extremity of the forward portion 251 of the mandrel member 250, the biasing spring 255 is compressed and the leading end portion 251 is urged toward the trailing end portion 252. With displacement of the dogs 258 relative to the cam member 259, the dogs 258 are pivoted outwardly and a projecting nib portion thereof engages the first turn of the spring replacement core R' (FIG. 19). Thereafter, expulsion of the winding core W and insertion of the spring replacement core R' proceeds by the application of a pushing force to the winding core W and a pulling force to the spring replacement core R'.

In summary, it is believed apparent that an apparatus and method have herein been disclosed which provide particular advantages for a processor of textile yarn by permitting the avoidance of a winding operation without requiring that a large inventory of replacement cores be maintained. Through the use of the apparatus of the present invention, it is not necessary that a processor provide a winder and pass the yarn through a winding operation, with the losses attendant thereto, in order to transfer the yarn from a conventional winding core such as a paper tube to a replacement core adapted for subsequent processing, such as a rigid perforate wall dye tube or a longitudinally compressible spring dye core. Instead, and in accordance with the method of the present invention, a plurality of packages of yarn may be advanced to a core replacemet station where the winding core is expelled from the package while a replacement core is inserted thereinto, without requiring the unwinding and rewinding of the yarn. Thus, the advantages of maintaining a low inventory of replacement cores are obtained without requiring that the disadvantages of an otherwise unnecessary winding operation be accepted.

In the drawings and specification, there have been set forth preferred embodiments of the invention, and although specific terms are employed, they are used in a generic and descriptive sense only and not for purposes of limitation, the scope of the invention being defined in the claims.

We claim:

1. Apparatus for preparing core supported wound packages of yarn for subsequent treatment comprising:
    means for moving a plurality of yarn packages along a predetermined common path of travel and for successively presenting each of said yarn packages at a core replacement station,
    core replacing means positioned adjacent said station for removing a winding core from while inserting a replacement core into an individual yarn package presented at said station, and
    means for sensing the presence of an individual yarn package at said station, for actuating said core replacing means in response to sensing of the presence of a yarn package and for successively repeating such actuation on successive presentation of others of said yarn packages.

2. Apparatus according to claim 1 wherein said package moving means includes means for aligning said packages at said station and said actuating means includes means responsive to the movement of a package into proper alignment for core replacement at said station.

3. Apparatus according to claim 1 wherein said means for moving packages comprises:
    first package trough means for receiving a plurality of commonly oriented packages and for advancing the same in single file to a dispensing position adjacent a terminal extremity of said trough means,
    package advancing means adjacent said terminal extremity for receiving and intermittently advancing a single package from the dispensing position to said core replacement station, and
    second package trough means for receiving packages from said package advancing means.

4. Apparatus according to claim 3 wherein said package advancing means comprises:
    a rotatable member having a plurality of package receiving pockets in the periphery thereof and supported for rotation adjacent the dispensing position, and
    rotation actuation means operatively engaging said rotatable member for controllably driving the same to rotate a package receiving pocket through a predetermined arc of a circle and thereby advance the single package.

5. Apparatus according to claim 4 wherein said rotation actuation means resiliently urges said rotatable member in driving the same and includes means operatively engaging said rotatable member for positively locating the same upon advancement thereby of a package to a predetermined position proper for removal and insertion of cores by said core replacing means.

6. Apparatus according to claim 1 wherein said core replacing means comprises:
    a member supported adjacent said core replacement station for movement along a predetermined path of travel between two extreme positions, one of which is remote from said common path of package travel and the other of which intercepts said common path, and for engaging both of said winding and replacement cores for removal and insertion thereof upon movement from said remote position to said intercepting position.

7. Apparatus according to claim 6 wherein said member is a mandrel having a reduced diameter portion of dimensions appropriate to penetrate said cores and a shoulder portion of larger diameter adapted to engage a trailing end of a longitudinally rigid replacement core penetrated by said mandrel for pushing the same into a package as the leading end of the replacement core pushes the winding core from the package.

8. Apparatus according to claim 6 wherein said member is a mandrel having a reduced diameter portion of dimensions appropriate to penetrate said cores and including means for engaging a leading end of a longitudinally compressible replacement core penetrated by said mandrel for pulling the same into a package as the winding core is pushed from the package.

9. Apparatus according to claim 1 further comprising:
    core supply means adjacent said core replacing means for receiving and containing a plurality of replacement cores and including controllable means for selectively releasing individual replacement cores to said core replacing means for insertion into packages.

10. Apparatus according to claim 1 further comprising:
    means at said core replacement station and operatively engageable by said core replacing means upon actuation thereof for engaging the wound package of yarn and compressing the same longitudinally of the replacement core.

11. Apparatus according to claim 1 wherein said means operative in response to the presence of an individual package includes means for sensing the size of packages moving along said common path and for diverting packages of other than a predetermined size from said common path in response to such sensing.

12. Apparatus for preparing core supported wound packages of yarn for subsequent treatment comprising:
    means for moving a plurality of yarn packages along a predetermined common path of travel and for successively presenting each of said yarn packages at a core replacement station,
    a member supported adjacent said core replacement station for movement along a predetermined path of travel between two extreme positions, one of which is remote from said common path of yarn package travel and the other of which intercepts said common path, said member engaging both a winding core and a replacement core upon movement from said remote position to said intercepting position for removing a winding core from while inserting a replacement core into an individual yarn package presented at said station, and means for sensing the presence and size of an individual yarn package at said station and for actuating said member to move from said remote position to said intercepting position in response to the presence of an individual yarn package of predetermined size at said station.

References Cited

UNITED STATES PATENTS

| 3,374,959 | 3/1968 | Tigges | 242—1 |
|---|---|---|---|
| 2,298,183 | 10/1942 | Susen | 29—225 |
| 2,841,937 | 7/1958 | Miskel | 29—211C |
| 2,906,011 | 9/1959 | Focht | 29—211 |
| 2,969,587 | 1/1961 | Dixon | 29—211X |
| 3,315,338 | 4/1967 | Tigges | 29—234 |
| 3,367,013 | 2/1968 | Mandonas | 29—211 |

ROBERT C. RIORDON, Primary Examiner

J. C. PETERS, Assistant Examiner